(No Model.)

S. M. HAMBLIN.
TENSION DEVICE FOR LOOM SHUTTLES.

No. 533,709. Patented Feb. 5, 1895.

Witnesses
C. O. Mason
S. E. Bain

Inventor
Stephen M. Hamblin
by H. M. Mason
Atty.

UNITED STATES PATENT OFFICE.

STEPHEN M. HAMBLIN, OF NEW BEDFORD, MASSACHUSETTS, ASSIGNOR OF ONE-HALF TO PARDON CORNELL, OF SAME PLACE.

TENSION DEVICE FOR LOOM-SHUTTLES.

SPECIFICATION forming part of Letters Patent No. 533,709, dated February 5, 1895.

Application filed September 13, 1894. Serial No. 522,901. (No model.)

*To all whom it may concern:*

Be it known that I, STEPHEN M. HAMBLIN, a citizen of the United States, residing at New Bedford, in the county of Bristol and State of Massachusetts, have invented certain new and useful Improvements in Tension Devices for Loom-Shuttles, of which the following is a specification.

The object of my invention is to prevent the screw which secures the tension device in the shuttle, and by means of which, the tension is regulated, from working out, and thereby breaking the warp threads through which the shuttle runs.

To this end, my invention consists in the devices illustrated in the accompanying drawings, in which—

Figure 1:
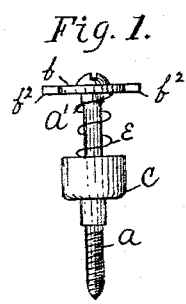
Figure 2:
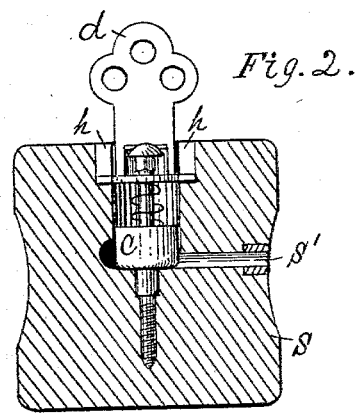
Figure 3:
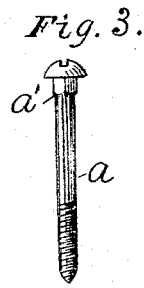
Figure 4:
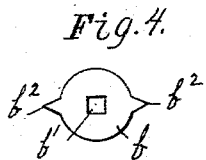
Figure 5:
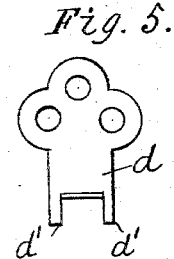

Figure 1, is an elevation of a shuttle-tension device provided with my inprovements. Fig. 2, is a view in cross section of a shuttle, through the point occupied by the tension device. Fig. 3, is a view, showing the peculiar construction of the screw which secures the tension device in the shuttle, and by means of which the degree of tension is regulated. Fig. 4, is a plan view of the lock plate, which prevents the screw from working out. Fig. 5, is a view of the key, by means of which the screw is operated.

Similar letters refer to similar parts in the several views.

The letter $a$, indicates a screw, having a small portion of its shank, immediately under its head, made square, as at $a'$.

$b$, indicates a plate, having a square hole $b'$, in its center to fit the square shank $a'$, of the screw, and provided with the wings $b^2$.

$s$, represents the shuttle, and $s'$ its delivery eye.

In the sides of the opening made to receive the tension plug $c$, are the grooves $h$, adapted to receive the wings $b^2$, of the plate $b$, so that said plate may move easily up and down in said opening.

The tension device, consisting of the screw $a$, plate $b$, plug $c$, and spring $e$, being adjusted in the shuttle as shown in Fig. 2, the plate cannot turn, because of its wings $b^2$, projecting into the grooves $h$; and the screw cannot turn, because the spring $e$, holds the plate on the squared shank of the screw, and thus locks it in position.

To advance, or retract the screw, a key $d$, shown in Fig. 5, having the legs $d'$, is used as shown in Fig. 2. The legs $d'$, push the plate below the squared portion of the shank of the screw, and the key then takes into the slot of the screw, and it is turned in the direction desired. On the key being removed, the spring $e$, acts to push the plate $b$, upward on the squared shank of the screw, and thus locks the screw in position.

Having thus described my invention, what I claim, and desire to secure by Letters Patent, is—

A loom shuttle, having an opening in its head provided with grooves, and said shuttle also provided with a thread way connecting with said opening; the plate $b$, having wings $b^2$, adapted to fit in said grooves, and having its center provided with the square hole $b'$, the screw $a$, secured in said shuttle and having squared shank $a'$, below its head adapted to fit in the square hole in the plate $b$, the plug $c$, adapted to slide easily on said screw; and the spring $e$, surrounding said screw between said plate $b$, and plug $c$.

STEPHEN M. HAMBLIN.

Witnesses:
HENRY W. MASON,
JAMES TAYLOR.